US009635749B2

(12) United States Patent
Kim et al.

(10) Patent No.: US 9,635,749 B2
(45) Date of Patent: Apr. 25, 2017

(54) APPARATUS FOR GENERATING EXTREME ULTRAVIOLET LIGHT

(71) Applicant: SAMSUNG ELECTRONICS CO., LTD., Suwon-si, Gyeonggi-do (KR)

(72) Inventors: Sung-Joo Kim, Hwaseong-si (KR); Jin-Seok Heo, Suwon-si (KR); Do-Hyun Seo, Hwaseong-si (KR); Da-Hae Lee, Incheon (KR); Jae-Pil Lee, Hwaseong-si (KR); Sung-Jo Hwang, Anseong-si (KR)

(73) Assignee: SAMSUNG ELECTRONICS CO., LTD., Suwon-si. Gyeonggi-do (KR)

( * ) Notice: Subject to any disclaimer, the term of this patent is extended or adjusted under 35 U.S.C. 154(b) by 0 days.

(21) Appl. No.: 14/995,398

(22) Filed: Jan. 14, 2016

(65) Prior Publication Data

US 2016/0278195 A1 Sep. 22, 2016

(30) Foreign Application Priority Data

Mar. 19, 2015 (KR) ........................ 10-2015-0037982

(51) Int. Cl.
*H05G 2/00* (2006.01)
*H01S 3/223* (2006.01)

(52) U.S. Cl.
CPC ........... *H05G 2/006* (2013.01); *H01S 3/2232* (2013.01); *H05G 2/005* (2013.01); *G21K 2201/065* (2013.01); *H05G 2/008* (2013.01)

(58) Field of Classification Search
USPC ..................................................... 250/504 R
See application file for complete search history.

(56) References Cited

U.S. PATENT DOCUMENTS 7,491,955 B2 2/2009 Shiraishi
7,608,846 B2 10/2009 Nakano
7,615,766 B2 11/2009 Nakano
8,003,962 B2 8/2011 Someya et al.
8,212,228 B2 7/2012 Abe et al.
8,304,752 B2 11/2012 Fomenkov et al.
8,445,877 B2 5/2013 Someya et al.
8,809,823 B1 8/2014 Senekerimyan et al.
2010/0231130 A1* 9/2010 Labetski ............. G03F 7/70033 315/111.41
2010/0258748 A1* 10/2010 Vaschenko ............. H05G 2/003 250/504 R
2013/0134326 A1 5/2013 Yabu et al.
2014/0160453 A1* 6/2014 Kempen ................ H05G 2/003 355/53
2014/0246607 A1 9/2014 Bykanov et al.

FOREIGN PATENT DOCUMENTS

JP 2008-226462 A 9/2008
KR 10-2010-0073098 A 7/2010

* cited by examiner

*Primary Examiner* — Kiet T Nguyen
(74) *Attorney, Agent, or Firm* — Lee & Morse, P.C.

(57) ABSTRACT

An apparatus for generating extreme ultraviolet light includes a droplet generator which provides a droplet to react with light from a light source to generate extreme ultraviolet light, a droplet collector which collects the droplet, and a droplet detector which includes a plurality of pressure sensors, the pressure sensors detect a position of the droplet provided to the droplet collecting unit.

20 Claims, 18 Drawing Sheets

APPARATUS FOR GENERATING EXTREME ULTRAVIOLET LIGHT

CROSS-REFERENCE TO RELATED APPLICATION

Korean Patent Application No. 10-2015-0037982, filed on Mar. 19, 2015, in the Korean Intellectual Property Office, and entitled: "Apparatus for Generating Extreme Ultraviolet Light," is incorporated by reference herein in its entirety.

BACKGROUND

1. Field

The present disclosure relates to an apparatus for generating extreme ultraviolet light.

2. Description of the Related Art

Recently, lithography, which uses extreme ultraviolet light for microfabrication of semiconductor devices, has been proposed. Lithography is a technique which reduces and projects light or beams onto a silicon substrate through a mask having a circuit pattern drawn thereon, and exposes a photoresist material to light so as to form an electronic circuit.

The minimal processing dimensions of the circuit formed by optical lithography depend on the wavelength of a light source. Therefore, the wavelength of the light source needs to be shortened in an optical lithography process for fabricating semiconductor devices with reduced dimensions. Extreme ultraviolet (EUV) light sources may be suitably used as the next generation lithography light sources. EUV light has a wavelength of approximately 1 to 100 nm. Since extreme ultraviolet light has high absorption with respect to all materials, a reflective optical system is used rather than a transmissive optical system such as a lens.

For example, EUV light may be generated by deposition of, e.g., laser, energy into a source element to create ionized plasma. In detail, laser produced plasma (LPP), i.e., using the radiation of laser beam, and discharge produced plasma (DPP), i.e., using the discharge of a gas and driven by a pulse power technique, may include interaction of a laser beam with a droplet of source element, e.g., tin (Sn), to evaporate and superheat the source element to generate plasma that emits photons toward a reflective mirror to generate the EUV light.

SUMMARY

According to an aspect of an embodiment, there is provided an apparatus for generating extreme ultraviolet light, including a droplet generator which provides a droplet to react with light from a light source to generate extreme ultraviolet light, a droplet collector which collects the droplet, and a droplet detector which includes a plurality of pressure sensors, the pressure sensors detect a position of the droplet provided to the droplet collecting unit.

The plurality of pressure sensors may be arranged into a symmetrical structure.

The plurality of pressure sensors may be arranged into a shape of concentric circles.

The plurality of pressure sensors may be arranged into a lattice structure.

The droplet detector may further include at least one temperature sensor which senses a temperature of the droplet provided to the droplet collector.

The apparatus may further include a calculator which calculates a periodic cycle of an arrival of the droplet at the droplet collector in accordance with detection results of the droplet detector.

The apparatus may further include a controller which controls an operation of the droplet generator in accordance with detection results of the droplet detector.

According to another aspect of an embodiment, there is provided an apparatus for generating extreme ultraviolet light, including a droplet generator which provides, in a first or second axial direction, a droplet that reacts with light from a light source to generate extreme ultraviolet light, a droplet collector which collects the droplet, and a droplet detector including a multi-axis force sensor that detects the first or second axial direction in which the droplet provided to the droplet collector moves.

The apparatus may further include a pressure sensor that detects a position of the droplet provided to the droplet collector.

The droplet detector may further include at least one temperature sensor that senses a temperature of the droplet provided to the droplet collector.

The apparatus may further include a calculator which calculates a periodic cycle of an arrival of the droplet at the droplet collector in accordance with detection results of the droplet detector.

The apparatus may further include a controller which controls an operation of the droplet generator in accordance with detection results of the droplet detector.

According to yet another aspect of an embodiment, there is provided an apparatus for generating extreme ultraviolet light, including a droplet collector which collects droplets that did not react with light from a light source, a first pressure sensor which detects a first position of a first droplet of the droplets that arrived at the droplet collector, and a second pressure sensor which detects a second position of a second droplet of the droplets that arrived at the droplet collector, the second position being different from the first position.

The first pressure sensor and the second pressure sensor may be spaced apart from each other.

The apparatus may further include a third pressure sensor that senses a third position of a third droplet of the droplets that arrived at the droplet collector, the third position being different from the first and second positions.

The first pressure sensor and the second pressure sensor may have a first distance therebetween, the first distance being equal to a second distance between the first pressure sensor and the third pressure sensor.

The apparatus may further include a temperature sensor that senses a temperature of the droplets arrived at the droplet collector.

The apparatus may further include a calculator which calculates a periodic cycle of an arrival of the droplets at the droplet collector in accordance with a first detection result of the first pressure sensor or a second detection result of the second pressure sensor.

The apparatus may further include a controller which controls an operation of the droplet generator in accordance with a first detection result of the first pressure sensor or a second detection result of the second pressure sensor.

The light provided by the light source may include a $CO_2$ laser.

The droplet may include Sn.

According to still another aspect of an embodiment, there is provided an apparatus for generating extreme ultraviolet light, including a vessel, a light source which provides light into the vessel, a droplet generator which provides a droplet toward the light in the vessel, a droplet collector in the vessel which collects the droplet, a droplet detector which detects a position or temperature of the droplet using collected by droplet collector, and a controller which controls an operation of the droplet generator in accordance with detection results of the droplet detector.

The apparatus may further include a calculator which calculates a periodic cycle of an arrival of the droplet at the droplet collector in accordance with the detection results.

The light provided by the light source may include a $CO_2$ laser.

The droplet may include Sn.

According to yet another aspect of an embodiment, there is provided an apparatus for generating extreme ultraviolet light, including a droplet generator which provides a droplet to react with light from a light source to generate extreme ultraviolet light, a droplet collector which collects a portion of the droplet after reaction with the light, the light being emitted in a space between the droplet generator and the droplet collector, and a droplet detector on the droplet collector, the droplet detector including a plurality of pressure sensors on a surface facing the droplet generator.

The plurality of pressure sensors may be arranged into a symmetrical structure.

The droplet detector may further include a temperature sensor adjacent to each pressure sensor.

The apparatus may further include a controller that adjusts dimensions and direction of droplets released from the droplet generator in accordance with detection results of the pressure sensors in the droplet detector.

The controller may adjust operation of the droplet generator in real-time based on periodic or continuous monitoring of the pressure sensors in the droplet detector.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
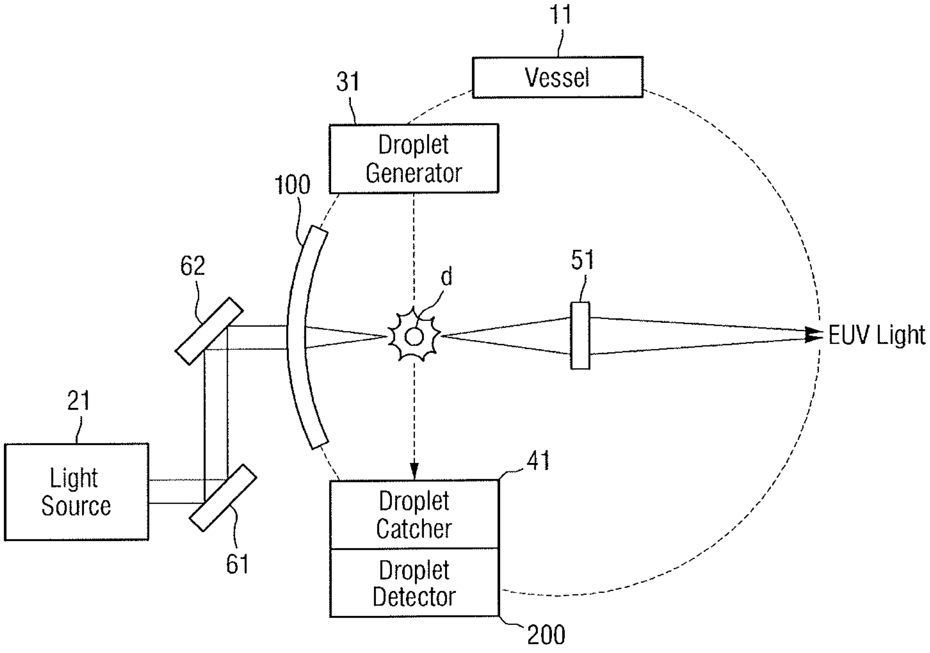
FIG. 1 schematically illustrates an apparatus for generating extreme ultraviolet light according to an embodiment.

Example embodiments will now be described more fully hereinafter with reference to the accompanying drawings, in which preferred embodiments are shown. Example embodiments may, however, be embodied in different forms and should not be construed as limited to those set forth herein. Rather, these embodiments are provided so that this disclosure will be thorough and complete, and will fully convey exemplary implementations to those skilled in the art. The same reference numbers indicate the same components throughout the specification. In the attached figures, the thickness of layers and regions may be exaggerated for clarity.

It will also be understood that when a layer is referred to as being “on” another layer or substrate, it can be directly on the other layer or substrate, or intervening layers (i.e., elements) may also be present. In contrast, when an element is referred to as being “directly on” another element, there are no intervening elements present.

Spatially relative terms, such as “beneath,” “below,” “lower,” “above,” “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

The use of the terms “a” and “an” and “the” and similar referents in the context of describing the example embodiments (especially in the context of the following claims) are to be construed to cover both the singular and the plural, unless otherwise indicated herein or clearly contradicted by context. The terms “comprising,” “having,” “including,”

and "containing" are to be construed as open-ended terms (i.e., meaning "including, but not limited to,") unless otherwise noted.

Unless defined otherwise, all technical and scientific terms used herein have the same meaning as commonly understood by one of skill in the art. It is noted that the use of any and all examples, or exemplary terms provided herein is intended merely to better illuminate the example embodiments and is not limiting unless otherwise specified. Further, unless defined otherwise, all terms defined in generally used dictionaries may not be overly interpreted.

The example embodiments will be described with reference to perspective views, cross-sectional views, and/or plan views, in which preferred embodiments are shown. Thus, the profile of an exemplary view may be modified according to manufacturing techniques and/or allowances. That is, the embodiments are not intended to be limited but cover all changes and modifications that can be caused due to a change in manufacturing process. Thus, regions shown in the drawings are illustrated in schematic form and the shapes of the regions are presented simply by way of illustration and not as a limitation.

An apparatus for generating extreme ultraviolet light according to an embodiment will now be described with reference FIG. 1.

FIG. 1 schematically illustrates an apparatus for generating extreme ultraviolet light according to an embodiment.

Referring to FIG. 1, the apparatus for generating extreme ultraviolet light according to an embodiment may include a droplet generator 31, a droplet catcher 41, a droplet detector 200, etc.

The apparatus for generating extreme ultraviolet light according to the present disclosure generates extreme ultraviolet light using a chemical reaction between a light beam and a droplet of material in a vessel 11. The droplet generator 31 for providing a droplet d and the droplet catcher 41 for receiving the droplet d provided in a vertical direction are arranged in the vessel 11. For example, as illustrated in FIG. 1, the droplet generator 31 may be arranged vertically above the droplet catcher 41 within the vessel 11.

The droplet d may include at least one of tin (Sn), lithium (Li), and Xenon (Xe), e.g., the droplet d may be a gas or a cluster of tin (Sn), lithium (Li), Xenon (Xe), and the like. For example, the droplet d is provided, e.g., dropped, into a space within the vessel 11 at a vacuum state. For example, the droplet d is provided to the space at a pressure of approximately 1 mbar.

A light source 21 provides a first light into the vessel 11. That is, the first light provided by the light source 21 interacts with the droplet d within the vessel 11, thereby generating extreme ultraviolet light. The first light from the light source 21 may be provided into the vessel 11 toward the droplet d along, e.g., via, reflector mirrors 61 and 62. The light source 21 may be, e.g., a $CO_2$ laser. For example, the first light may be $CO_2$ laser oscillating at a high pulse of about 40 kHz or higher and with a wavelength of about 9.3 μm or about 10.6 μm.

A collector mirror 100 is disposed at one side of the vessel 11. The collector mirror 100 may have a center with a hole to enable the first light from the light source 21 to be provided into the vessel 11. The droplet d from the droplet generator 31 reacts with the first light provided into the vessel 11 so as to thereby generate extreme ultraviolet light. The collector mirror 100 collects and reflects thus-generated extreme ultraviolet light, and concentrates the collected and reflected extreme ultraviolet light onto a focusing lens 51, so the extreme ultraviolet light is emitted from the focusing lens 51 to the outside of the vessel 11. Thus-generated extreme ultraviolet light may be used in an exposure apparatus in a lithography process.

In order to increase the efficiency of generation of extreme ultraviolet light generated by the reaction between the droplet d from the droplet generator 31 and the first light, the droplet d having an appropriate dimension needs to be provided. Further, the droplet d needs to be provided to a predetermined position at a constant time interval.

According to the present embodiment, whether the above-described droplet d with an appropriate dimension is provided into the vessel 11, whether the droplet d is provided at an appropriate periodic cycle, and whether the droplet is provided to an appropriate position, and the like may be detected on a real time basis. If the droplet d with an appropriate dimension is not provided, if the droplet d is not provided at an appropriate periodic cycle, and/or if the droplet d is not provided to an appropriate position, an operation of the droplet generator 31 is controlled to adjust the mode of providing the droplet d. Thus, the apparatus for generating extreme ultraviolet light may have increased efficiency of generation of extreme ultraviolet light.

If the apparatus for generating extreme ultraviolet light does not operate smoothly, such a non-smooth operation may affect an overall operation of a system, and then unnecessary costs may be added later to make the system operate normally. To reduce such unnecessary follow-up measures, the mode of providing the droplet d needs to be detected on a real time basis as advance measures, and such advance measures can be accomplished through example embodiments.

For example, when the mode of providing the droplet d is conventionally detected by an image photography and analysis using a camera module, a time interval of providing the droplet d can be detected. However, it may be difficult to detect the position to which the droplet d is provided and the dimension of the provided droplet d.

Further problems related to the mode of providing the droplet d may be caused when the droplet d is sprayed out from the droplet generator 31 or when a position shift of the droplet d occurs. In this case, the droplet d from the droplet generator 31 may not be provided to the droplet catcher 41 but provided to the collector mirror 100 or the like, thereby contaminating the collector mirror 100.

Other problems related to the mode of providing the droplet d may be an occurrence of droplet satellites which may cause difficulty in optimizing the efficiency of generation of extreme ultraviolet light in the apparatus for generating extreme ultraviolet light. The droplet satellites are small droplets landing additionally around the main droplet.

In contrast, according to the present disclosure, the mode of providing the droplet d into the vessel 11 may be detected on a real time basis to minimize problems related to droplet d integrity. That is, according to the present disclosure, it is possible to monitor and adjust in real time the periodic cycle of the droplet d, the direction of the droplet d, the position of the droplet d, the dimensions of the droplet d, and so on.

Figure 2:
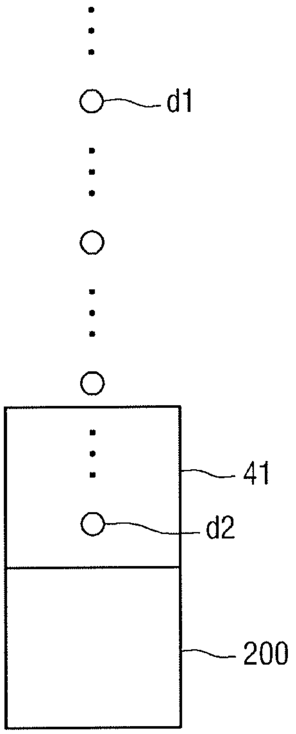
FIG. 2 schematically illustrates a part of the apparatus for generating extreme ultraviolet light according to an embodiment.
Figure 3A:
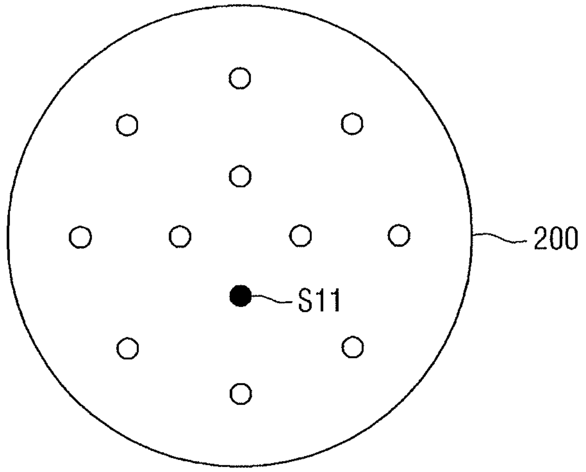
FIGS. 3A and 3B illustrate an example of a droplet detector in the apparatus for generating extreme ultraviolet light according to an embodiment.
Figure 3B:
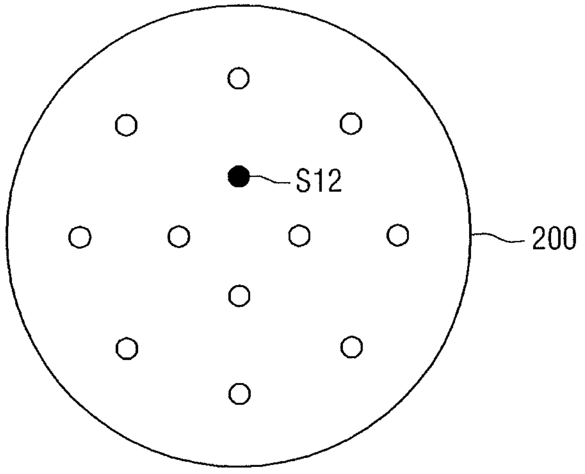

FIG. 2 schematically illustrates an enlarged part, i.e., the droplet catcher 41 and the droplet detector 200, of the apparatus for generating extreme ultraviolet light according to an embodiment. FIGS. 3A and 3B illustrate examples of the droplet detector 200.

Referring to FIGS. 1 and 2, the droplet d provided to the droplet catcher 41 can be used in detecting the position to which the droplet d is provided through the use of the droplet detector 200. Hereinafter, a droplet released from the droplet generator 31 will be referred to as a first droplet d1, and a droplet contacting the droplet catcher 41 and then the droplet detector 200 will be referred to as a second droplet d2.

When the first droplet d1 is provided, e.g., released, by the droplet generator 31, most of the first droplet d1 reacts with the first light, e.g., reacts with a $CO_2$ laser beam, to generate extreme ultraviolet light. However, a part of the first droplet d1 may contact the droplet catcher 41 so as to be used in detecting droplet integrity. In this case, the part of the first droplet d1 used in detecting droplet integrity, i.e., the part of the first droplet d1 contacting the droplet catcher 41, is the second droplet d2 (FIG. 2).

The position to which the second droplet d2 is provided may be detected, the direction in which the second droplet d2 is provided may be detected, the periodic cycle of providing the second droplet d2 may be detected, or the dimension of the second droplet d2 may be detected to calculate the position to which the first droplet d1 is provided, the direction in which the first droplet d1 is provided, the periodic cycle of providing the first droplet d1, or the dimension of the first droplet d1 using the information obtained from detecting those regarding the second droplet d2.

Referring to FIGS. 3A and 3B, an example of an arrangement of pressure sensors provided on the droplet detector 200 is shown. The droplet detector 200 has a surface on which a plurality of pressure sensors are arranged, and the plurality of pressure sensors are used to detect the position to which the second droplet d2 is provided, the periodic cycle of providing the second droplet d2, the dimension of the second droplet d2, and the like.

For example, referring to FIG. 3A, a first second droplet d2 may be first dropped on a first pressure sensor S11. The first pressure sensor S11 detects the first second droplet d2 and recognizes coordinates regarding the position of the first second droplet d2 relative to the first pressure sensor S11, thereby calculating the position to which the first second droplet d2 is provided.

After elapse of a predetermined time, the position to which a second droplet d2 is provided can be changed. For example, referring to FIG. 3B, a second second droplet d2 can be provided to a region where a second pressure sensor S12 is located. In this case, the second pressure sensor S12 detects the second second droplet d2 and recognizes coordinates regarding the position of the second second droplet d2 relative to the second pressure sensor S12, thereby calculating the position to which the second second droplet d2 is provided and detecting a change of position relative to the position of the first second droplet d1 in FIG. 3A.

Using the method described above with reference to FIGS. 3A-3B, it is possible to detect the position to which the second droplet d2 is provided, and whether the position to which the first droplet d1 is provided from the droplet generator 31 has changed. Thus, a necessity of controlling an operation of the droplet generator 31 can be recognized.

Pressure is the magnitude of force applied to a unit area of a surface of a certain object in a vertical direction, and a pressure sensor may measure the pressure applied to a surface of the pressure sensor so as to measure the position of an object. The pressure sensor measures pressure using displacement, deformation, magneto-thermal conductivity, vibrational frequency and the like, and various types of pressure sensors may be used in the present disclosure. The plurality of pressure sensors including the first and second pressure sensors S11 and S12 may be provided to the droplet detector 200 so as to detect, on a real time basis, the position to which the second droplet d2 is provided.

Furthermore, the plurality of pressure sensors including the first and second pressure sensors S11 and S12 may be provided to the droplet detector 200 so as to detect the periodic cycle of providing the second droplet d2. For example, when the second droplet d2 is continuously provided to the first pressure sensor S11, a change in the pressure measured by the first pressure sensor S11 may be detected, and the peak position of the pressure may be detected as the point of time where the second droplet d2 is provided. The periodic cycle of providing the second droplet d2 can be calculated based on the peak position of the pressure measured by the first pressure sensor S11.

Furthermore, the plurality of pressure sensors including the first and second pressure sensors S11 and S12 may be provided to the droplet detector 200 so as to detect the dimension of the second droplet d2 provided to the droplet detector 200. For example, when the second droplet d2 is continuously provided to the first pressure sensor S11, if pressure is detected as being provided from a certain moment by the first pressure sensor S11 and another adjacent pressure sensor, then it can be known that the dimension of the second droplet d2 provided to the droplet detector 200 is increased. That is, when the dimension of the second droplet d2 is increased, pressure can be detected by the plurality of pressure sensors, e.g., by more than only the first pressure sensor S11. This indicates that the dimension of the first droplet d1 provided by the droplet generator 31 is increased, and since the first droplet d1 having an appropriate dimension needs to be provided to increase the efficiency of generation of extreme ultraviolet light, an operation of the droplet generator 31 may be controlled to adjust the dimension of the first droplet d1.

Figure 4:
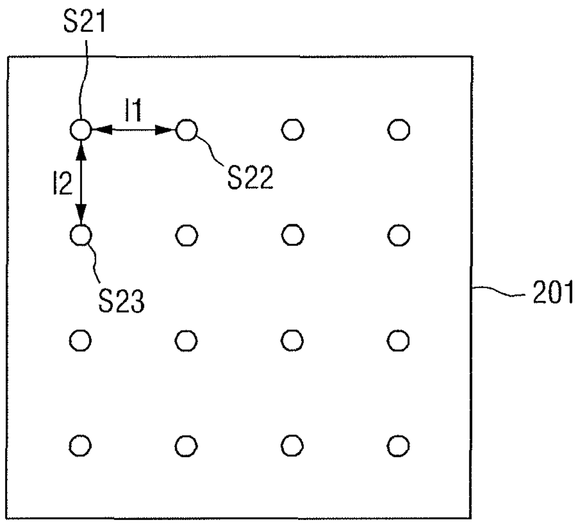
FIG. 4 illustrates an example of a droplet detector in an apparatus for generating extreme ultraviolet light according to another embodiment.

FIG. 4 illustrates an example of a droplet detector in an apparatus for generating extreme ultraviolet light according to another embodiment.

Referring to FIG. 4, a droplet detector 201 may have a surface on which a plurality of pressure sensors may be arranged into a lattice structure. For example, a plurality of pressure sensors including a third pressure sensor S21, a fourth pressure sensor S22, and a fifth pressure sensor S23 may be arranged on the surface of the droplet detector 201.

In this case, a first distance 11 between the third pressure sensor S21 and the fourth pressure sensor S22, and a second distance 12 between the third pressure sensor S21 and the fifth pressure sensor S23 may be equal. That is, since the plurality of pressure sensors are arranged to have substantially equal spacing therebetween, the positions at which the plurality of pressure sensors are arranged, respectively, can be easily recognized and the position of the second droplet d2 provided to the droplet detector 201 can also be easily detected. An operation of the droplet generator 31 for providing the first droplet d1 needs to be controlled based on the position of the second droplet d2 provided to the droplet detector 201, and therefore, an accurate position to which the second droplet d2 is provided needs to be detected. Thus, the position to which the second droplet d2 is provided can be accurately detected from a regularity of the plurality of pressure sensors arranged on the surface of the droplet detector 201.

Referring to FIG. 4, since the plurality of pressure sensors are arranged into a lattice structure on the surface of the droplet detector 201, the positions of the pressure sensors in two-dimensional coordinates can be easily detected. Furthermore, whether the position of the second droplet d2 provided to the droplet detector 201 is changed can be easily detected, and a change in the dimension of the second droplet d2 can be easily detected if such change occurs.

When the plurality of pressure sensors are arranged with a predetermined regularity, the droplet detector 201 can be easily manufactured. This may also offer advantages in terms of costs for manufacturing the droplet detector 201 and time consumed in manufacturing the droplet detector 201.

Figure 5:
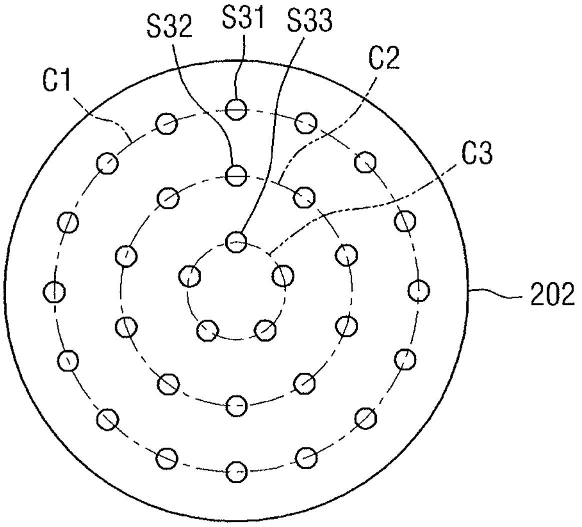
FIG. 5 illustrates an example of a droplet detector in an apparatus for generating extreme ultraviolet light according to yet another embodiment.

FIG. 5 illustrates an example of a droplet detector in an apparatus for generating extreme ultraviolet light according to yet another embodiment.

Referring to FIG. 5, a droplet detector 202 may have a surface on which a plurality of pressure sensors may be arranged into a symmetrical structure. For example, the plurality of pressure sensors may be arranged into a shape of concentric circles on the surface of the droplet detector 202.

For example, a plurality of pressure sensors including a sixth pressure sensor S31, a seventh pressure sensor S32 and an eighth pressure sensor S33 may be arranged on the surface of the droplet detector 202. In this case, the sixth pressure sensor S31 may be disposed on a first circle C1, the seventh pressure sensor S32 may be disposed on a second circle C2, and the eighth pressure sensor S33 may be disposed on a third circle C3.

The plurality of pressure sensors may be arranged into a shape of concentric circles on the surface of the droplet detector 202, thus increasing the number of pressure sensors which can be disposed on the same plane. That is, density of pressure sensors may be increased in a unit area.

Furthermore, spacing between the plurality of sensors disposed on the first, the second, and the third circles C1, C2 and C3 is maintained constant to thus enable the position of the second droplet d2 provided to the droplet detector 202 to be easily detected. An operation of the droplet generator 31 for providing the first droplet d1 needs to be controlled based on the position of the second droplet d2 provided to the droplet detector 202, and therefore, an accurate position to which the second droplet d2 is provided needs to be detected. Thus, the position to which the second droplet d2 is provided can be accurately detected from a regularity of the plurality of pressure sensors arranged on the surface of the droplet detector 202.

Referring to FIG. 5, since the plurality of pressure sensors are arranged into a shape of concentric circles on the surface of the droplet detector 202, the positions of the pressure sensors in plane circular coordinates can be easily detected. That is, it is easy to detect the position of the second droplet d2 provided to the droplet detector 202 by calculating the distance and direction from a center position if the droplet detector 202. Furthermore, whether the position of the second droplet d2 provided to the droplet detector 202 is changed can be easily detected, and a change in the dimension of the second droplet d2 can be easily detected if such change occurs.

When the plurality of pressure sensors are arranged with a predetermined regularity, the droplet detector 202 can be easily manufactured. This may also offer advantages in terms of costs for manufacturing the droplet detector 202 and time consumed in manufacturing the droplet detector 202.

Figure 6:
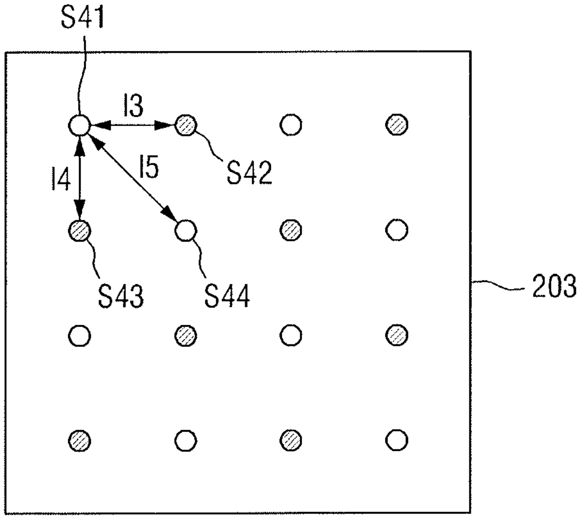
FIG. 6 illustrates an example of a droplet detector in an apparatus for generating extreme ultraviolet light according to still another embodiment.

FIG. 6 illustrates an example of a droplet detector in an apparatus for generating extreme ultraviolet light according to still another embodiment.

Referring to FIG. 6, a droplet detector 203 may have a surface on which a plurality of pressure sensors and a plurality of temperature sensors may be arranged into a lattice structure. For example, a plurality of pressure sensors (white circles in FIG. 6) and a plurality of temperature sensors (gray circles in FIG. 6) including a ninth pressure sensor S41, a tenth pressure sensor S44, a first temperature sensor S42, and a second temperature sensor S43 may be arranged on the surface of the droplet detector 203.

Temperature sensors measure the temperature of a certain object, and the temperature indicates the dimension of a motion or vibration energy of atoms or molecules. Since it is difficult to directly measure the temperature of a certain object, the temperature can be measured from a converted physical quantity, e.g., displacement, pressure, resistance, voltage, frequency and the like. Such temperature sensors include contact type temperature sensors and non-contact type temperature sensors, and although the droplet detector 203 is described as including contact type temperature sensors, embodiments are not limited thereto.

The temperature of the second droplet d2 provided to the droplet detector 203 can be detected using the plurality of temperature sensors arranged on the surface of the droplet detector 203. Whether a non-ideal reaction occurs within the vessel 11 can be detected by measuring the temperature of the second droplet d2. In this case, an overall system may be affected, and therefore, an apparatus for generating extreme ultraviolet light needs to be stopped and causes of problems need to be found. To this end, a plurality of temperature sensors may be arranged on the surface of the droplet detector 203.

FIG. 6 illustrates an example in which a plurality of pressure sensors and a plurality of temperature sensors are arranged alternately into a lattice structure on the surface of the droplet detector 203. In this case, a third distance 13 between the ninth pressure sensor S41 and the first temperature sensor S42, and a fourth distance 14 between the ninth pressure sensor S41 and the second temperature sensor S43 may be substantially equal. In addition, the distance between the first temperature sensor S42 and the tenth pressure sensor S44, and the distance between the second temperature sensor S43 and the tenth pressure sensor S44 may be substantially equal.

That is, since the plurality of pressure sensors and the plurality of temperature sensors are arranged to have substantially equal spacing therebetween, the positions at which the plurality of pressure sensors and temperature sensors are arranged, respectively, can be easily recognized and the position of the second droplet d2 provided to the droplet detector 203 can also be easily detected.

An operation of the droplet generator 31 for providing the first droplet d1 needs to be controlled based on the position of the second droplet d2 provided to the droplet detector 203, and therefore, an accurate position to which the second droplet d2 is provided needs to be detected. Thus, the position to which the second droplet d2 is provided can be accurately detected from a regularity of the plurality of pressure sensors arranged on the surface of the droplet detector 203. Further, the temperature of the second droplet d2 may be measured by the plurality of temperature sensors arranged on the surface of the droplet detector 203 to detect whether the first droplet d1 reacts non-ideally to the first light (for example, $CO_2$ laser beam).

Referring to FIG. 6, since the plurality of pressure sensors and the plurality of temperature sensors are arranged alternately into a lattice structure on the surface of the droplet detector 203, the positions of the pressure sensors and temperature sensors in two-dimensional coordinates can be easily detected. Further, since the temperature of the second droplet d2 provided to the droplet detector 203 can be simultaneously measured, it may be easy to detect whether the first droplet d1 and the first light (for example, $CO_2$ laser beam) non-ideally react to each other.

When the plurality of pressure sensors and the plurality of temperature sensors are arranged with a predetermined regularity, the droplet detector 203 can be easily manufactured. This may also offer advantages in terms of costs for manufacturing the droplet detector 203 and time consumed in manufacturing the droplet detector 203.

Figure 7:
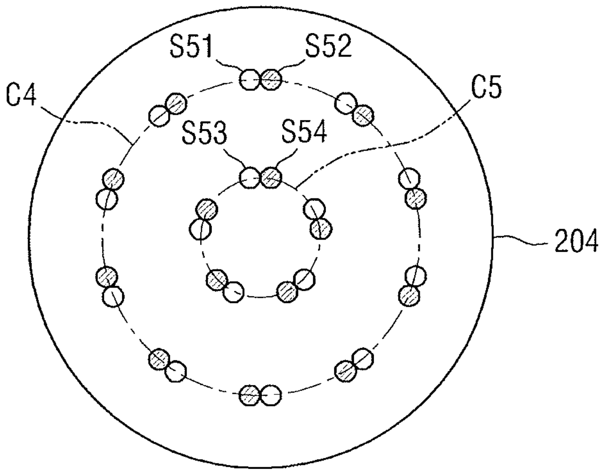
FIG. 7 illustrates an example of a droplet detector in an apparatus for generating extreme ultraviolet light according to yet still another embodiment.

FIG. 7 illustrates an example of a droplet detector in an apparatus for generating extreme ultraviolet light according to yet still another embodiment.

Referring to FIG. 7, a droplet detector 204 may have a surface on which a plurality of pressure sensors and a plurality of temperature sensors are arranged in pairs in the vicinity of each other, and the plurality of pairs of pressure sensors and temperature sensors may be arranged into a shape of concentric circles. For example, an eleventh pressure sensor S51, a twelfth pressure sensor S53, a third temperature sensor S52 and a fourth temperature sensor S54 may be arranged on the surface of the droplet detector 204. In this case, the eleventh pressure sensor S51 and the third temperature sensor S52 may be arranged on a fourth circle C4, and the twelfth pressure sensor S53 and the fourth temperature sensor S54 may be arranged on a fifth circle C5.

The plurality of pressure sensors and the plurality of temperature sensors may be arranged into a shape of concentric circles on the surface of the droplet detector 204, thus increasing the number of pressure sensor and temperature sensors which can be arranged on the same plane. That is, density may be increased in which the plurality of pressure sensors and temperature sensors are arranged.

Since the spacing between the plurality of pressure sensors arranged on the fourth and fifth circles C4 and C5 is maintained constant, the position of the second droplet d2 provided to the droplet detector 204 can be easily detected. An operation of the droplet generator 31 for providing the first droplet d1 needs to be controlled based on the position of the second droplet d2 provided to the droplet detector 204, and therefore, an accurate position to which the second droplet d2 is provided needs to be detected. Thus, the position to which the second droplet d2 is provided can be accurately detected from a regularity of the plurality of pressure sensors arranged on the surface of the droplet detector 204.

Referring to FIG. 7, since the plurality of pressure sensors are arranged into a shape of concentric circles on the surface of the droplet detector 204, the positions of the pressure sensors in plane circular coordinates can be easily detected. That is, it is easy to detect the position of the second droplet d2 provided to the droplet detector 204 by calculating the distance and direction from a center position. Furthermore, whether the position of the second droplet d2 provided to the droplet detector 204 is changed can be easily detected, and a change in the dimension of the second droplet d2 can be easily detected if such change occurs.

Further, the temperature of the second droplet d2 provided to the droplet detector 204 can be detected using the plurality of temperature sensors arranged on the surface of the droplet detector 204. Whether a non-ideal reaction occurs within the vessel 11 can be detected by measuring the temperature of the second droplet d2. In this case, an overall system may be affected, and therefore, an apparatus for generating extreme ultraviolet light needs to be stopped and causes of problems need to be found. To this end, a plurality of temperature sensors may be arranged on the surface of the droplet detector 204. Since the temperature of the second droplet d2 provided to the droplet detector 204 can be simultaneously measured, it may be easy to detect whether the first droplet d1 and the first light (for example, $CO_2$ laser beam) non-ideally react to each other.

When the plurality of pressure sensors and the plurality of temperature sensors are arranged with a predetermined regularity, the droplet detector 204 can be easily manufactured. This may also offer advantages in terms of costs for manufacturing the droplet detector 204 and time consumed in manufacturing the droplet detector 204.

Figure 8:
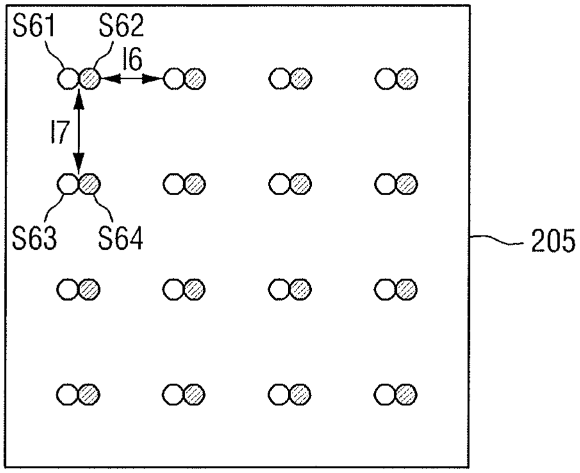
FIG. 8 illustrates an example of a droplet detector in an apparatus for generating extreme ultraviolet light according to yet still another embodiment.

FIG. 8 illustrates an example of a droplet detector in an apparatus for generating extreme ultraviolet light according to yet still another embodiment.

Referring to FIG. 8, a droplet detector 205 may have a surface on which a plurality of pressure sensors and a plurality of temperature sensors are arranged in pairs in the vicinity of each other, and the plurality of pairs of pressure sensors and temperature sensors may be arranged into a lattice structure. For example, a thirteenth pressure sensor S61, a fourteenth pressure sensor S63, a fifth temperature sensor S62 and a sixth temperature sensor S64 may be arranged on the surface of the droplet detector 205.

In this case, one pair of pressure sensor and temperature sensor may be arranged with equal spacing from adjacent other pairs of pressure sensors and temperature sensors. For example, a sixth distance 16 and a seventh distance 17 may be substantially equal.

That is, since the plurality of pressure sensors and the plurality of temperature sensors are arranged to have substantially equal spacing therebetween, the positions at which the plurality of pressure sensors are arranged, respectively, can be easily recognized and the position of the second droplet d2 provided to the droplet detector 205 can also be easily detected.

An operation of the droplet generator 31 for providing the first droplet d1 needs to be controlled based on the position of the second droplet d2 provided to the droplet detector 205, and therefore, an accurate position to which the second droplet d2 is provided needs to be detected. Thus, the position to which the second droplet d2 is provided can be accurately detected from a regularity of the plurality of pressure sensors arranged on the surface of the droplet detector 205. Further, the temperature of the second droplet d 2 may be measured by the plurality of temperature sensors arranged on the surface of the droplet detector 205 to detect whether the first droplet d1 reacts non-ideally to the first light (for example, $CO_2$ laser beam).

Referring to FIG. 8, since the plurality of pairs of pressure sensors and temperature sensors are arranged into a lattice structure on the surface of the droplet detector 205, the positions in two-dimensional coordinates can be easily detected. Further, since the temperature of the second droplet d2 provided to the droplet detector 205 can be simultaneously measured, it may be easy to detect whether the first droplet d1 and the first light (for example, $CO_2$ laser beam) non-ideally react to each other. Also, when the plurality of pressure sensors and the plurality of temperature sensors are arranged with a predetermined regularity, the droplet detector 205 can be easily manufactured. This may also offer advantages in terms of costs for manufacturing the droplet detector 205 and time consumed in manufacturing the droplet detector 205.

Figure 9:
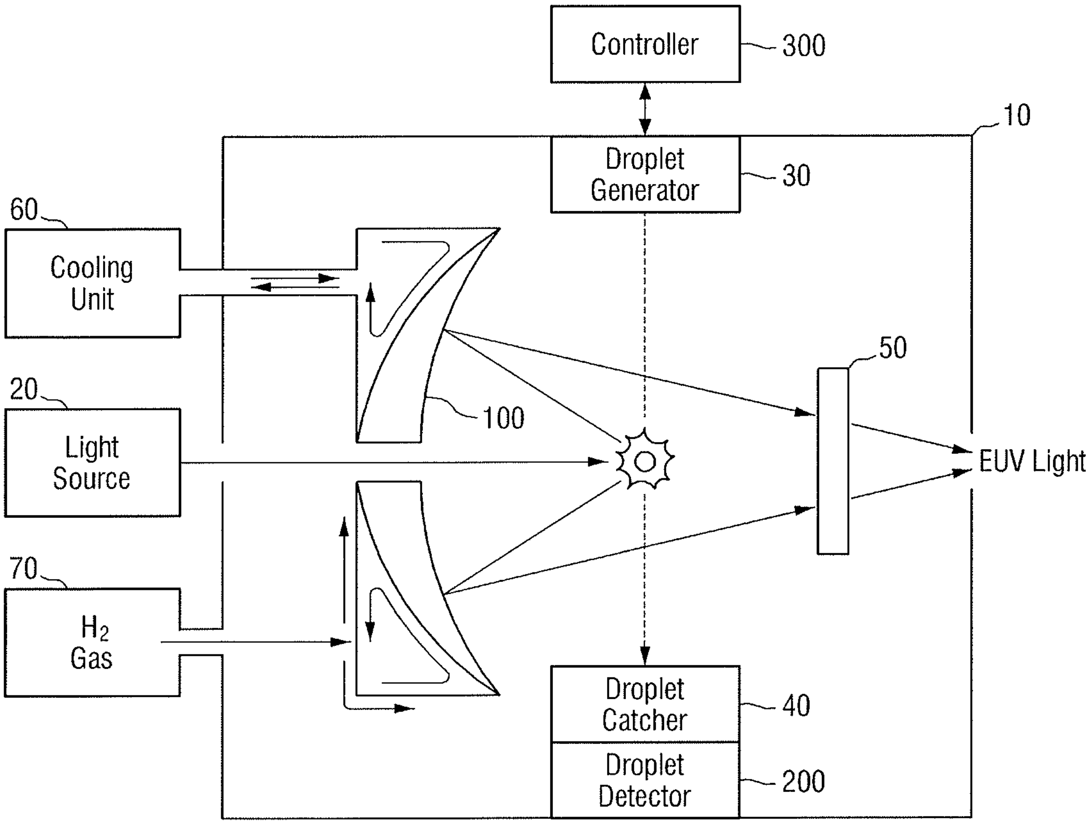
FIG. 9 schematically illustrates an apparatus for generating extreme ultraviolet light according to yet still another embodiment.
Figure 10:
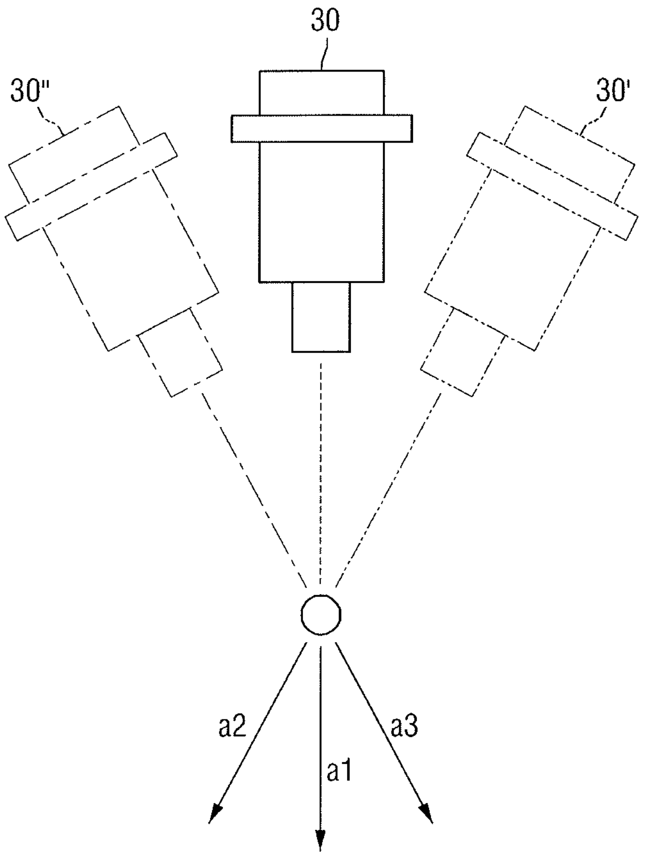
FIG. 10 illustrates an operation of a droplet generator applied to an apparatus for generating extreme ultraviolet light.

FIG. 9 schematically illustrates an apparatus for generating extreme ultraviolet light according to yet still another embodiment. FIG. 10 illustrates an operation of a droplet generator applied to an apparatus for generating extreme ultraviolet light. For convenience of explanation, descriptions on the parts substantially the same as those described above will be omitted.

Referring to FIG. 9, an apparatus for generating extreme ultraviolet light according to yet still another embodiment may include a vessel 10, a light source 20, a droplet generator 30, a droplet catcher 40, a focusing lens 50, the collector mirror 100, a cooling unit 60, a gas supply unit 70, the droplet detector 200, and a controller 300.

The vessel 10 is a space for accommodating devices for generating extreme ultraviolet light, and a space in which the droplet d and the first light provided from the light source 20 react with each other to generate extreme ultraviolet light.

The droplet generator 30 and the droplet catcher 40 may be arranged in the vessel 10, and the collector mirror 100 may be disposed on a rear side of the vessel 10. The vessel 10 may have a closed space overall. However, the vessel 10 may have one side with holes for entry/exit of light.

The light source 20 provides the first light. In this case, the first light may be, e.g., $CO_2$ laser. For example, the first light may be $CO_2$ laser oscillating at a high pulse of about 40 kHz or higher and a wavelength of about 9.3 μm or about 10.6 μm. The first light provided by the light source 20 interacts with the droplet d provided by the droplet generator 30 so as to produce extreme ultraviolet light.

The droplet generator 30 may provide the droplet d into the vessel 10. For example, the droplet generator 30 may be arranged on an upper side of the vessel 10 so as to provide the droplet d toward a lower side of the vessel 10. The droplet catcher 40 may be arranged on the lower side of the vessel 10 so as to receive the droplet d provided by the droplet generator 30. The droplet d provided into the vessel 10 may interact with the first light provided by the light source 20 so as to generate extreme ultraviolet light. Thus, the droplet d may include at least one of tin (Sn), lithium (Li) and Xenon (Xe), e.g., the droplet d may be a gas or cluster of tin (Sn), lithium (Li), Xenon (Xe), and the like.

The focusing lens 50 may be arranged in the vessel 10 so as to focus the extreme ultraviolet light produced by the interaction between the droplet d and the first light, and emit the extreme ultraviolet light to the outside of the vessel 10.

The collector mirror 100 may be arranged on the rear side of the vessel 10 so as to collect and reflect the extreme ultraviolet light produced by the interaction between the droplet d and the first light. In this case, the temperature of the collector mirror 100 may increase since the extreme ultraviolet light reaches and is reflected at the collector mirror 100. Therefore, the cooling unit 60 may be arranged at one side of the collector mirror 100 so as to control the temperature of the collector mirror 100.

The cooling unit 60 may provide cooling water to one side of the collector mirror 100. The cooling water may be provided along a cooling line from a storage tank of the cooling unit 60 arranged outside the vessel 10 to one side of the collector mirror 100. The cooling water may circulate within the cooling unit 60, and the cooling unit 60 has a closed space for preventing the cooling water from leaking to the outside.

The gas supply unit 70 may provide process gas (for example, $H_2$ gas) into the vessel 10. That is, the process gas is provided to one side of the collector mirror 100 in the vessel 10, and the process gas flows along one side of the collector mirror 100 so as to prevent droplet deposits from being accumulated on a reflection surface of the collector mirror 100 and keep the collector mirror 100 clean. In addition, such a flow of process gas may increase efficiency of generation of extreme ultraviolet light.

The droplet detector 200 may include a plurality of pressure sensors for detecting the position of the droplet d provided to the droplet catcher 40. In this case, the droplet detector 200 may further include a plurality of temperature sensors. With regard to the temperature sensors, the droplet detector 200 may be substantially the same as the droplet detectors described with reference to FIGS. 3*a* to 8. In addition, the droplet detector 200 may have features different from those of the droplet detectors described with reference to FIGS. 3*a* to 8.

The droplet detector 200 may further include a multi-axis force sensor capable of detecting an axial direction in which the droplet d provided to the droplet catcher 40 shifts. The multi-axis force sensor means a sensor capable of simultaneously measuring force components in three directions and moment components in three directions. With the multi-axis force sensor, vertical force and horizontal force can be simultaneously measured in an easy way.

FIG. 10 illustrates an example in which an axis of the droplet generator 30 may change to cause a change in the axis in direction of providing the droplet d. For example, when the droplet generator 30 is located on axis a1, the droplet d may be provided in the direction of a1, when a droplet generator 30' is located on axis a2, the droplet d may be provided in the direction of a2, and when a droplet generator 30" is located on axis a3, the droplet d may be provided in the direction of a3. The axial direction in which the droplet generator 30 is located may change with elapse of time, and if such a change in the axial direction is not deliberate, an operation of the droplet generator 30 needs to be controlled in such a manner that the droplet d can be provided in an appropriate axial direction.

When the droplet detector 200 includes a multi-axis force sensor, the axial direction of the droplet d provided to a surface of the droplet detector 200 through the droplet catcher 40 can be detected so as to recognize whether the axial direction of the droplet d provided from the droplet generator 30 is abnormal.

The controller 300 may control an operation of the droplet generator 30 using the result of the detection of the droplet detector 200. The controller 300 may adjust, as needed, a time interval of operating the droplet generator 30, and may adjust the position, angle or the like of the droplet generator 30, such that the droplet d can be provided to an appropriate position, at an appropriate periodic cycle, and in an appropriate direction.

Figure 11:
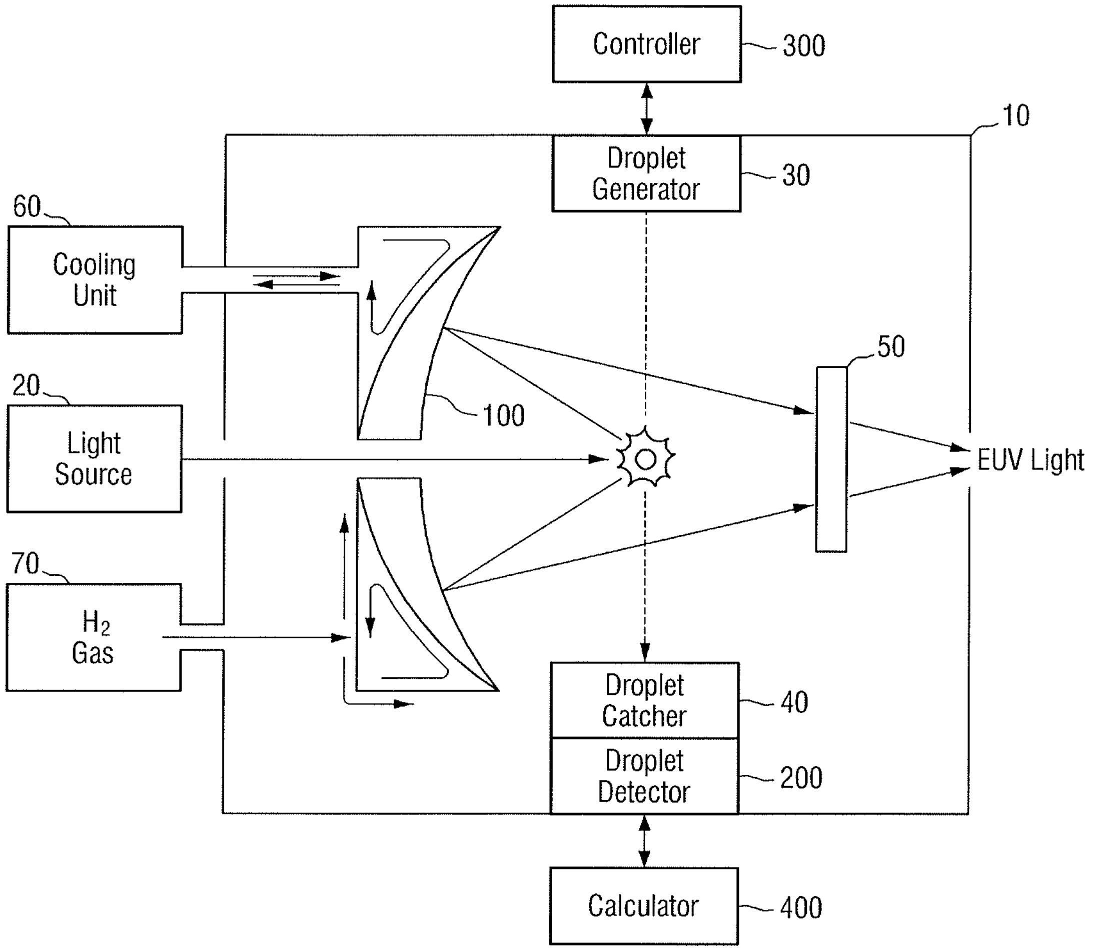
FIG. 11 schematically illustrates an apparatus for generating extreme ultraviolet light according to yet still another embodiment.

FIG. 11 schematically illustrates an apparatus for generating extreme ultraviolet light according to yet still another embodiment. For convenience of explanation, descriptions on the parts substantially same as those described above will be omitted.

Referring to FIG. 11, an apparatus for generating extreme ultraviolet light according to yet still another embodiment may include the vessel 10, the light source 20, the droplet generator 30, the droplet catcher 40, the focusing lens 50, the collector mirror 100, the cooling unit 60, the gas supply unit 70, the droplet detector 200, the controller 300, and a calculator 400. Components except the calculator 400 are substantially the same as those described above, and therefore, only an operation of the calculator 400 will be explained hereinafter.

The calculator 400 may calculate the periodic cycle of the arrival of the droplet d at the droplet catcher 40 using the result of the detection of the droplet detector 200. The calculator 400 may calculate, as needed, the periodic cycle of the arrival of the droplet d at the droplet catcher 40 by applying an appropriate algorithm, and provide the result of the calculation to the controller 300 so as to provide information required for controlling an operation of the droplet generator 30 by the controller 300.

Figure 12:
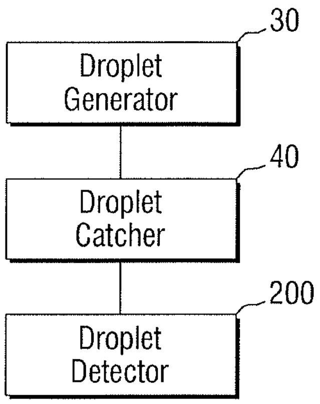
FIG. 12 illustrates a schematic block diagram of an apparatus for generating extreme ultraviolet light according to yet still another embodiment.

FIG. 12 is a block diagram schematically illustrating an apparatus for generating extreme ultraviolet light according to yet still another embodiment. For convenience of explanation, descriptions of parts substantially the same as those described above will be omitted.

Referring to FIG. 12, an apparatus for generating extreme ultraviolet light according to yet still another embodiment may include the droplet generator 30, the droplet catcher 40, and the droplet detector 200.

The droplet generator 30 provides the droplet d which reacts with light from a light source to produce extreme ultraviolet light. The droplet catcher 40 may collect the droplet d, and the droplet detector 200 may detect the position or temperature of the droplet d provided to the droplet catcher 40. Furthermore, the droplet detector 200 may detect the axial direction of the droplet d provided to the droplet catcher 40. In this case, the droplet detector 200 may include a pressure sensor, a temperature sensor, a multi-axis force sensor or the like, and the arrangement of these sensors may be substantially same as those described above.

Figure 13:
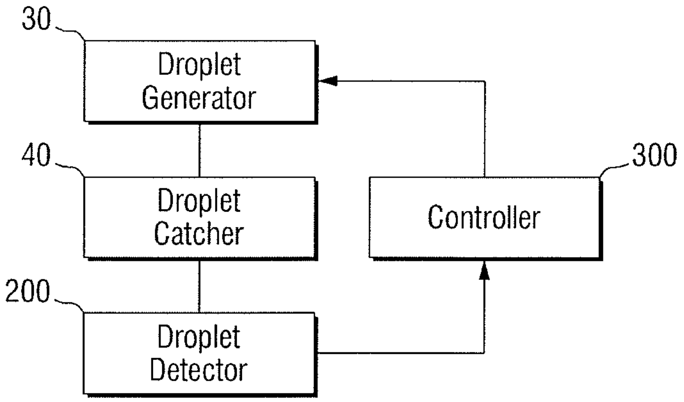
FIG. 13 illustrates a schematic block diagram of an apparatus for generating extreme ultraviolet light according to yet still another embodiment.

FIG. 13 is a block diagram schematically illustrating an apparatus for generating extreme ultraviolet light according to yet still another embodiment.

Referring to FIG. 13, an apparatus for generating extreme ultraviolet light according to yet still another embodiment may include the droplet generator 30, the droplet catcher 40, the droplet detector 200, and the controller 300.

The droplet generator 30 provides the droplet d which reacts with light from a light source to produce extreme ultraviolet light. The droplet catcher 40 may collect the droplet d, and the droplet detector 200 may detect the position or temperature of the droplet d provided to the droplet catcher 40. Furthermore, the droplet detector 200 may detect the axial direction of the droplet d provided to the droplet catcher 40. In this case, the droplet detector 200 may include a pressure sensor, a temperature sensor, a multi-axis force sensor or the like, and the arrangement of these sensors may be substantially same as those described above. The controller 300 may control an operation of the droplet generator 30 using the result of the detection of the droplet detector 200.

Figure 14:
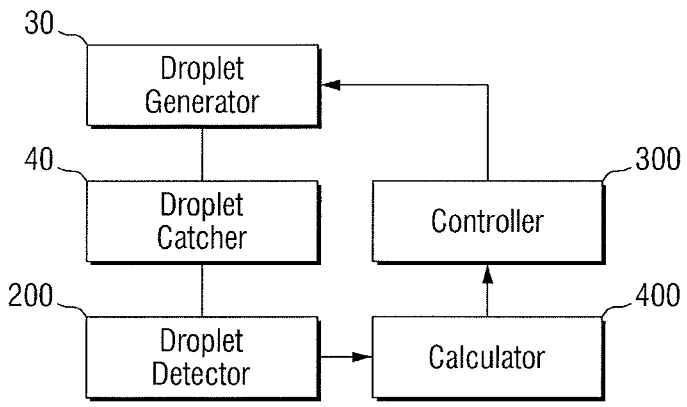
FIG. 14 illustrates a schematic block diagram of an apparatus for generating extreme ultraviolet light according to yet still another embodiment.

FIG. 14 is a block diagram schematically illustrating an apparatus for generating extreme ultraviolet light according to yet still another embodiment.

Referring to FIG. 14, an apparatus for generating extreme ultraviolet light according to yet still another embodiment may include the droplet generator 30, the droplet catcher 40, the droplet detector 200, the controller 300, and the calculator 400.

The droplet generator 30 provides the droplet d which reacts with light from a light source to produce extreme ultraviolet light.

The droplet catcher 40 may collect the droplet d, and the droplet detector 200 may detect the position or temperature of the droplet d provided to the droplet catcher 40. Furthermore, the droplet detector 200 may detect the axial direction of the droplet d provided to the droplet catcher 40. In this case, the droplet detector 200 may include a pressure sensor, a temperature sensor, a multi-axis force sensor or the like, and the arrangement of these sensors may be substantially same as those described above.

The controller 300 may control an operation of the droplet generator 30 using the result of the detection of the droplet detector 200. The calculator 400 may calculate the periodic cycle of the arrival of the droplet d at the droplet catcher 40 using the result of the detection of the droplet detector 200, and provide the result of the calculation to the controller 300 so as to provide information required for controlling an operation of the droplet generator 30 by the controller 300.

Figure 15:
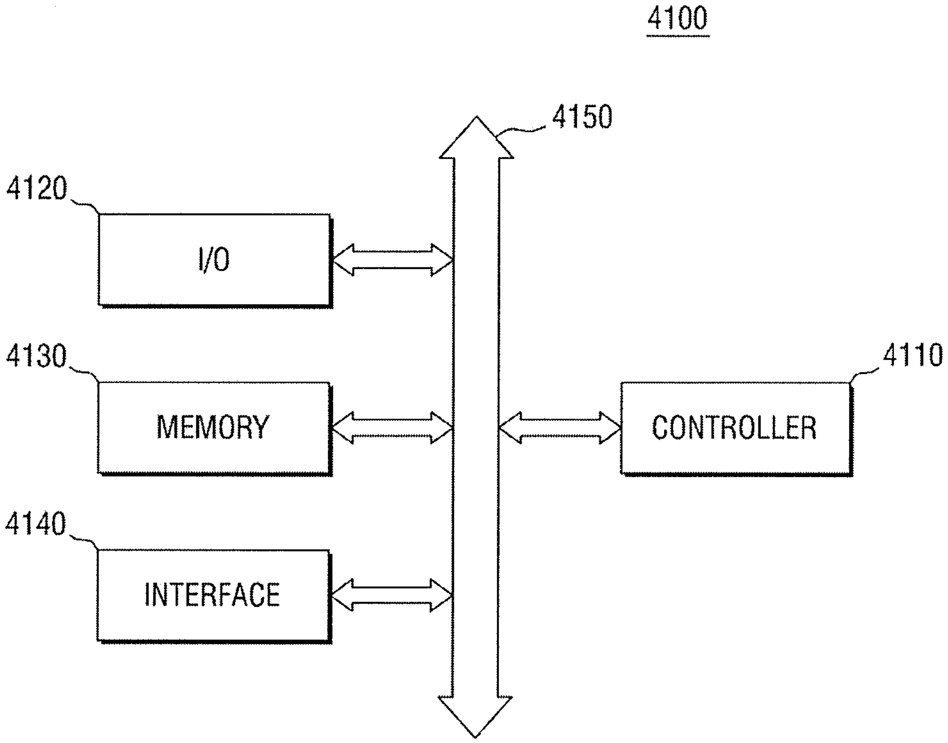
FIG. 15 illustrates a block diagram of an electronic system including a semiconductor device fabricated using the apparatuses for generating extreme ultraviolet light according to some embodiments.

FIG. 15 is a block diagram of an electronic system including a semiconductor device fabricated using the apparatuses for generating extreme ultraviolet light according to some embodiments.

Referring to FIG. 15, an electronic system 4100 according to embodiments may include a controller 4110, an input/output (I/O) device 4120, a memory device 4130, an interface 4140, and a bus 4150.

The controller 4110, the input/output (I/O) device 4120, the memory device 4130, and/or the interface 4140 may be combined, e.g., connected, with each other through the bus 4150. The bus 4150 may serve as a path for data migration.

The controller 4110 may include at least one of, e.g., a microprocessor, a digital signal processor, a microcontroller and logic elements capable of performing functions similar to those of the microprocessor, the digital processor and the microcontroller.

The input/output device 4120 may include, e.g., a keypad, a keyboard, a display or the like.

The memory device 4130 may store therein data and/or instructions or the like.

The interface 4140 may perform functions of transmitting data to a communication network or receiving data from the communication network. The interface 4140 may be wired or wireless. For example, the interface 4140 may include an antenna, wired/wireless transceiver or the like.

Although not shown in the drawing, the electronic system 4100 may further include high speed DRAM and/or SRAM as an operating memory for improving an operation of the controller 4110. The semiconductor device according to embodiments may be provided in the memory device 4130 or provided as a part of the controller 4110, the input/output device 4120 and the like.

The electronic system 4100 can be applied to a personal digital assistant (PDA), a portable computer, a web tablet, a wireless phone, a mobile phone, a digital music player, a memory card or all electronic products capable of transmitting and/or receiving information under a wireless environment.

Figure 16:
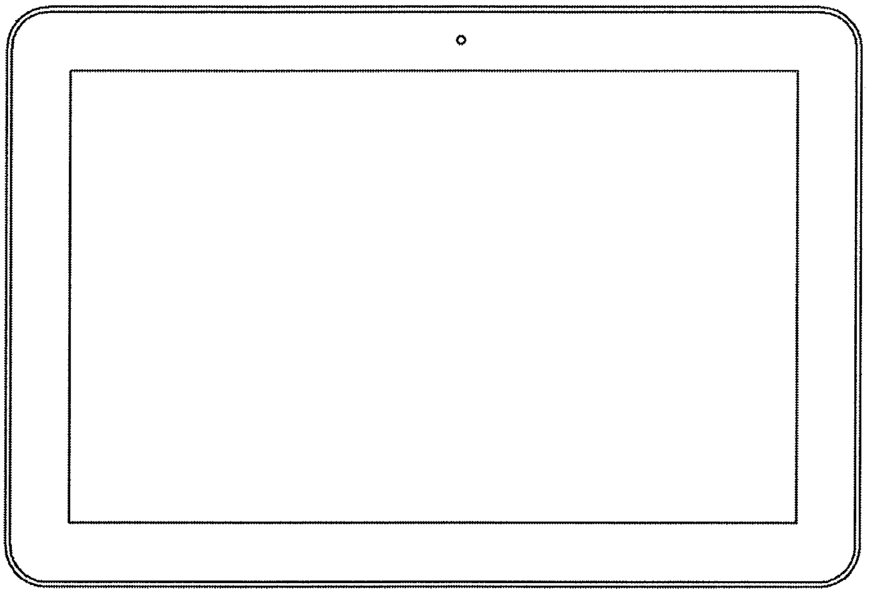
FIGS. 16 and 17 illustrate an example of a semiconductor system to which the semiconductor device fabricated using the apparatuses for generating extreme ultraviolet light according to some embodiments can be applied.
Figure 17:
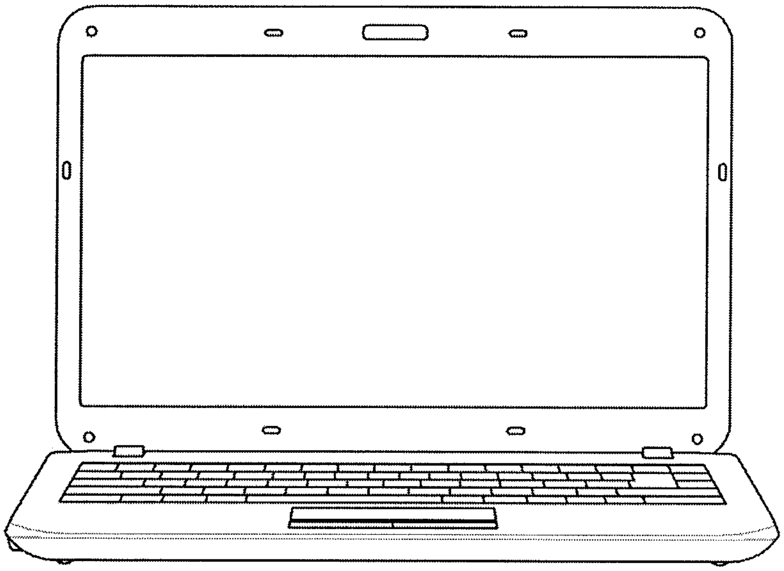

FIGS. 16 and 17 illustrate an example of a semiconductor system to which the semiconductor device fabricated using the apparatuses for generating extreme ultraviolet light according to some embodiments can be applied.

FIG. 16 illustrates a tablet PC and FIG. 17 illustrates a notebook computer. The semiconductor device fabricated using the apparatuses for generating extreme ultraviolet light according to some embodiments can be used in a tablet PC, a notebook computer and the like. It would be obvious to those skilled in the art that the semiconductor device fabricated using the apparatuses for generating extreme ultraviolet light according to some embodiments can be applied to other integrated circuit devices which are not set forth herein.

By way of summation and review, an embodiment provides an apparatus for generating extreme ultraviolet light capable of providing droplets to be used therein to a predetermined position at a constant time interval and improving efficiency of reaction between the droplets and a $CO_2$ laser. Another embodiment provides an apparatus for generating extreme ultraviolet light capable of detecting a position to which droplets to be used in the apparatus are provided and dimensions of the droplets on a real time basis, and controlling an operation of a droplet generating unit using the information obtained from the detection, thereby improving efficiency of generation of extreme ultraviolet light. The above may be achieved by using a droplet detector with a plurality of distributed force/pressure sensors, so that a position and/or a dimension change of a droplet may be detected and measured by the distributed sensors.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for generating extreme ultraviolet light, comprising:

a droplet generator which provides a droplet to react with light from a light source to generate extreme ultraviolet light;

a droplet collector which collects the droplet; and a droplet detector which includes a plurality of pressure sensors, the pressure sensors detect a position of the droplet provided to the droplet collector.

2. The apparatus as claimed in claim 1, wherein the plurality of pressure sensors are arranged into a symmetrical structure.

3. The apparatus as claimed in claim 2, wherein the plurality of pressure sensors are arranged into a shape of concentric circles.

4. The apparatus as claimed in claim 1, wherein the plurality of pressure sensors are arranged into a lattice structure.

5. The apparatus as claimed in claim 1, wherein the droplet detector further comprises at least one temperature sensor which senses a temperature of the droplet provided to the droplet collector.

6. The apparatus as claimed in claim 1, further comprising a calculator which calculates a periodic cycle of an arrival of the droplet at the droplet collector in accordance with detection results of the droplet detector.

7. The apparatus as claimed in claim 1, further comprising a controller which controls an operation of the droplet generator in accordance with detection results of the droplet detector.

8. An apparatus for generating extreme ultraviolet light, comprising:

a droplet collector which collects droplets that did not react with light from a light source;

a first pressure sensor which detects a first position of a first droplet of the droplets that arrived at the droplet collector; and a second pressure sensor which detects a second position of a second droplet of the droplets that arrived at the droplet collector, the second position being different from the first position.

9. The apparatus as claimed in claim 8, wherein the first pressure sensor and the second pressure sensor are spaced apart from each other.

10. The apparatus as claimed in claim 8, further comprising a third pressure sensor that senses a third position of a third droplet of the droplets that arrived at the droplet collector, the third position being different from the first and second positions.

11. The apparatus as claimed in claim 10, wherein the first pressure sensor and the second pressure sensor have a first distance therebetween, the first distance being equal to a second distance between the first pressure sensor and the third pressure sensor.

12. The apparatus as claimed in claim 8, further comprising a temperature sensor that senses a temperature of the droplets arrived at the droplet collector.

13. The apparatus as claimed in claim 8, further comprising a calculator which calculates a periodic cycle of an arrival of the droplets at the droplet collector in accordance with a first detection result of the first pressure sensor or a second detection result of the second pressure sensor.

14. The apparatus as claimed in claim 8, further comprising a controller which controls an operation of a droplet generator in accordance with a first detection result of the first pressure sensor or a second detection result of the second pressure sensor.

15. The apparatus as claimed in claim 8, wherein the light provided by the light source includes a $CO_2$ laser.

16. The apparatus as claimed in claim 15, wherein the droplet includes Sn.

17. An apparatus for generating extreme ultraviolet light, comprising:

a vessel;

a light source which provides light into the vessel;

a droplet generator which provides a droplet toward the light in the vessel;

a droplet collector in the vessel which collects the droplet;

a droplet detector which detects a position or temperature of the droplet using collected by the collector; and a controller which controls an operation of the droplet generator in accordance with detection results of the droplet detector.

18. The apparatus as claimed in claim 17, further comprising a calculator which calculates a periodic cycle of an arrival of the droplet at the droplet collector in accordance with the detection results.

19. The apparatus as claimed in claim 17, wherein the light provided by the light source includes a $CO_2$ laser.

20. The apparatus as claimed in claim 19, wherein the droplet includes Sn.

* * * * *